United States Patent
Schmiegel et al.

(10) Patent No.: US 7,840,030 B2
(45) Date of Patent: Nov. 23, 2010

(54) METHOD FOR DETERMINING THE CHANGE IN POSITION OF AN OBJECT IN AN ITEM OF LUGGAGE

(75) Inventors: Armin Schmiegel, Hamburg (DE); Marc Schwarze, Ahlerstedt (DE)

(73) Assignee: Morpho Detection, Inc., Newark, CA (US)

( * ) Notice: Subject to any disclaimer, the term of this patent is extended or adjusted under 35 U.S.C. 154(b) by 790 days.

(21) Appl. No.: 11/245,670

(22) Filed: Oct. 7, 2005

(65) Prior Publication Data

US 2006/0078161 A1    Apr. 13, 2006

(30) Foreign Application Priority Data

Oct. 8, 2004    (DE) .................... 10 2004 049 227

(51) Int. Cl.
  *G06K 9/00* (2006.01)
  *G01N 23/04* (2006.01)
(52) U.S. Cl. .................. 382/103; 382/100; 382/107; 382/141; 382/143; 378/53; 378/57
(58) Field of Classification Search ............ 382/100, 382/291, 103, 107, 141, 143; 378/53, 57
See application file for complete search history.

(56) References Cited

U.S. PATENT DOCUMENTS

| | | | | |
|---|---|---|---|---|
| 4,907,288 A | * | 3/1990 | Shimoni | 382/130 |
| 5,080,856 A | * | 1/1992 | Grenier et al. | 376/159 |
| 5,182,764 A | * | 1/1993 | Peschmann et al. | 378/57 |
| 5,293,574 A | * | 3/1994 | Roehm et al. | 378/98.2 |
| 5,319,547 A | * | 6/1994 | Krug et al. | 705/13 |
| 5,367,552 A | * | 11/1994 | Peschmann | 378/57 |
| 5,414,474 A | * | 5/1995 | Kamada et al. | 348/700 |
| 5,490,218 A | * | 2/1996 | Krug et al. | 382/100 |

(Continued)

FOREIGN PATENT DOCUMENTS

DE    101 06 877 A1    8/2001

(Continued)

OTHER PUBLICATIONS

G. L. Scott and H. C. Longuet-Higgins, "Feature grouping by relocalisation of eigenvectors of the proximity matrix" Proc. British Machine Vision Conference, pp. 103-108, 1990.*

(Continued)

*Primary Examiner*—Wenpeng Chen
*Assistant Examiner*—Gandhi Thirugnanam
(74) *Attorney, Agent, or Firm*—Armstrong Teasdale, LLP

(57) ABSTRACT

A method for determining the change in position of an object in an item of luggage using two X-ray images. The method includes allocating points to individual features in each X-ray image, and extracting the individual features to produce a set of extracted points for each X-ray image. The method includes searching for clusters in each set of extracted points. For each X-ray image a valuation function that displays different values when points of a cluster are close than when points of the cluster are not close is used to determine the proximity of each cluster. This permits analysis of the movement of the object to be performed by observing the proximities of the clusters.

15 Claims, 3 Drawing Sheets
(3 of 3 Drawing Sheet(s) Filed in Color)

U.S. PATENT DOCUMENTS

| | | | | |
|---|---|---|---|---|
| 5,661,774 | A * | 8/1997 | Gordon et al. | 378/101 |
| 5,712,926 | A * | 1/1998 | Eberhard et al. | 382/205 |
| 5,838,758 | A * | 11/1998 | Krug et al. | 378/53 |
| 5,905,806 | A * | 5/1999 | Eberhard et al. | 382/100 |
| 6,088,423 | A * | 7/2000 | Krug et al. | 378/57 |
| 6,351,573 | B1 * | 2/2002 | Schneider | 382/294 |
| 6,411,724 | B1 * | 6/2002 | Vaithilingam et al. | 382/100 |
| 6,728,394 | B1 * | 4/2004 | Chen et al. | 382/107 |
| 6,825,854 | B1 * | 11/2004 | Beneke et al. | 345/619 |
| 7,162,006 | B2 * | 1/2007 | Schmiegel | 378/57 |
| 7,263,160 | B2 * | 8/2007 | Schlomka et al. | 378/57 |
| 7,406,192 | B2 * | 7/2008 | Schmiegel et al. | 382/152 |
| 7,529,341 | B2 * | 5/2009 | Schlomka et al. | 378/90 |
| 2004/0022436 | A1 * | 2/2004 | Patti et al. | 382/191 |
| 2005/0094858 | A1 * | 5/2005 | Sirohey et al. | 382/131 |
| 2005/0123217 | A1 * | 6/2005 | Schmiegel et al. | 382/291 |
| 2006/0078161 | A1 * | 4/2006 | Schmiegel et al. | 382/103 |
| 2006/0203960 | A1 * | 9/2006 | Schlomka et al. | 378/57 |

FOREIGN PATENT DOCUMENTS

| | | |
|---|---|---|
| DE | 693 32 674 T2 | 12/2003 |
| WO | WO 2004/072685 A1 | 8/2004 |

OTHER PUBLICATIONS

N. Gale et al. "Unclassed matrix shading and optimal ordering in hierarchical cluster analysis", Journal of Classification, vol. 1, No. 1 / Dec. 1984.*

Marco Carcassoni, Edwin R. Hancock, "An Improved Point Proximity Matrix for Modal Matching," icpr, vol. 2, pp. 2034, 15th International Conference on Pattern Recognition (ICPR'00)—vol. 2, 2000.*

Barbara Zitova et al., "Robust Detection of Significant Points in Multiframe Images," Pattern Recognition Letters 20, 1999, pp. 199-206, 20, Elsevier Science B.V., The Netherlands.

Marco Carcassoni et al., "Correspondence Matching with Modal Clusters," IEEE Transactions on Pattern Analysis and Machine Intelligence, Dec. 2003, pp. 1609-1615, vol. 25, No. 12, IEEE Computer Society, U.S.A.

Gareth Loy et al., "Fast Radial Symmetry for Detecting Points of Interest," IEEE Transactions on Pattern Analysis and Machine Intelligence, Aug. 2003, pp. 959-973, vol. 25, No. 8, IEEE Computer. Society, U.S.A.

Barbara Zitova et al., "Image Registration Methods: a Survey," Image and Vision Computing, Oct. 2003, pp. 977-1000, 21, XP-001189327, Elsevier B.V., Great Britain.

Marco Carcassoni et al., "Correspondence Matching with Modal Clusters," IEEE Transactions on Pattern Analysis and Machine Intelligence, Dec. 2003, pp. 1609-1615, vol. 25, No. 12, IEEE Service Center, U.S.A.

Baihua Li et al., "Point Pattern Matching and Applications—a Review," IEEE International Conference on Systems, Man and Cybernetics, Oct. 2003, pp. 729-736, vol. 5, IEEE, U.S.A.

* cited by examiner

METHOD FOR DETERMINING THE CHANGE IN POSITION OF AN OBJECT IN AN ITEM OF LUGGAGE

CROSS-REFERENCE TO RELATED APPLICATIONS

This application claims priority under 35 U.S.C. §119(a)-(d) or (f) to prior-filed, co-pending German patent application serial number 10 2004 049227.1, filed on Oct. 8, 2004, which is hereby incorporated by reference in its entirety.

STATEMENT REGARDING FEDERALLY SPONSORED RESEARCH OR DEVELOPMENT

Not Applicable

NAMES OF PARTIES TO A JOINT RESEARCH AGREEMENT

Not Applicable

REFERENCE TO A SEQUENCE LISTING, A TABLE, OR COMPUTER PROGRAM LISTING APPENDIX SUBMITTED ON COMPACT DISC

Not Applicable

BACKGROUND OF THE INVENTION

1. Field of the Invention

The field of the invention relates to a method for determining the change in position of an object in an item of luggage by means of two X-ray images.

2. Description of Related Art

X-ray examination installations are known that can use appropriate methods to ascertain the change in position of an item of luggage between a first X-ray picture (which has usually been taken in another luggage-examination installation) and a second X-ray image. An effect of these methods is that, in the second-stage apparatus, only the suspect regions identified in the first-stage apparatus still need be examined to see whether they contain dangerous items or substances. Consequently, significant time savings and a much higher throughput rate are achieved. The first stage and second stage apparatuses can be physically separated. Unlike other systems, there may be two different examination apparatuses in different locations. Nor is any assumption made about the transportation of the items of luggage.

The basis of the known methods is that an image segmentation is carried out within the suspect region and the segmented objects ascertained in the second X-ray image. But such methods often fail due to the distorting and transparent structure of the X-ray images. If the two imaging systems also differ from each other in terms of their geometry the difficulties are even greater, as in that case, even with a strong absorber, the amplitude values in the images do not match. Added to this are also distortions in the image which stem from different perspectives. This means that even the topology of the images of the objects is not necessarily retained. Thus for example a cylinder can be displayed in one image as a rectangular structure, but in a second image as a round structure. Even in cases where the change in position of the item of luggage is correctly determined and thus the suspect region ascertained in the first X-ray image is precisely determined in the second X-ray image, there are still problems if the suspect object has moved before the second X-ray image is taken. In this case, the whole item of luggage must once again be examined fully, which results in a reduction of the throughput rate.

BRIEF SUMMARY OF THE INVENTION

These and other disadvantages are overcome by an embodiment of the invention that provides a method by which the displacement of an object within an item of luggage can be detected in order to match the suspect region to be investigated to the new location of the object.

Unlike the classic segmentation of objects in fluoroscopic images in which edges and surfaces with comparable amplitude or sufficient physical proximity are combined into single objects, it is provided according to the invention that points are allocated to individual features. Features include for example corners that derive from surface information, but are independent of the change in perspective. These features are then extracted according to the invention. The extraction of these significant points is based on a local weighting of the image information. The result of this weighting then serves to identify possible feature points. The result of the analysis of this weighting function is a set of points. The extraction method step is known for example from: Barbara Zitova, Jaroslav Kautsky, Gabriele Peters, Jan Flusser, Robust detection of significant points in multiframe images, Pattern Recognition Letters 20. For each of the two X-ray images a set of points is thus obtained, each of these sets of points representing images of rays. According to the invention, each set of points is then searched for clusters to ascertain the change in position. Clusters are defined as points that lie close to one another relative to a spacing function. The spacing function serves here as a weighting and valuation function (see here: Marco Carcassoni and Edwin R. Hancock, Correspondence Matching with Modal Clusters, IEEE Transactions on Pattern Analysis and Machine Intelligence, Vol. 25, No. 12, December 2003). It is assumed that objects generate a quantity of features the proximity ratios of which are retained after a physical transformation. This also applies if an object has been displaced, but not to objects that have no fixed shape, such as for example powder or liquids. However, if these substances are contained in a container with rigid outside walls, the proximity ratios also remain constant here. According to the invention, proximity in each X-ray image is determined by means of a valuation function that displays different values when the points are very close than when the points are less close.

According to an embodiment of the invention, the movement of two objects towards each other can be recorded by analysis by observing the proximities of individual clusters. As a result, it can thus be ascertained by the method according to the invention whether individual clusters have moved towards each other. As the clusters stand for parameterized objects, this is equivalent to the objects also having moved towards each other. This means that if an object from a suspect region is identified in the preliminary image, the displacement of this object in the second-stage image can be evaluated and thus the new position of this object precisely identified. The suspect region that has migrated with the object can now be analyzed separately in the second-stage apparatus and it is not necessary to analyze the whole item of luggage once again. As a result a great deal of time is saved, leading to a higher throughput rate.

An advantageous development of an embodiment of the invention provides that the X-ray images are fluoroscopic images. These are the representations predominantly used in preliminary and second-stage apparatuses, with the result that the method according to the invention can be used as software implementation on the known apparatuses.

A further advantageous development of an embodiment of the invention provides that the points are allocated to one another by means of a global transformation. This is a simple method for comparing the change in the points between the X-ray image of the preliminary stage and that of the second stage and evaluate the change. Firstly, the physical movement of the item of luggage, which has been determined by a complementary method, is ascertained. If this transformation is known—it usually consists of a rotation of the item of luggage in the conveyor belt plane, a translation and a 180° rotation about its own axis—the projection of each individual feature in the second image can be calculated. It is to be borne in mind here that the feature points now become surfaces, as the projection of a ray is involved here.

A further advantageous development of an embodiment of the invention provides that the features are extracted by means of a features filter. This features filter assesses the proximity of each image spot and delivers a weighting function as a result. This function shows for each individual image spot to what extent this image spot is a feature, for example a corner or an edge.

A further advantageous development of an embodiment of the invention provides that a scale analysis is carried out. Here, e.g. edges are extracted as feature factors over several resolution stages (so-called scales) which thus prove to be stable. The resolution stages are ascertained by low-pass filters, diffusion filters, or similar (see on this point: Gareth Loy and Alexander Zelinsky, Fast Radial Symmetry for Detecting Points of Interest, IEEE Transactions on Pattern Analysis and Machine Intelligence, Vol. 25, No. 8, August 2003). As a result it is possible to reduce the error susceptibility or misallocations and noise. The clusters are preferably divided into sub-groups and the sub-groups subjected to a movement analysis. The movement analysis compares the detected points in the images of the first-stage and second-stage apparatuses. Through projection (global transformation) of the points of the first-stage apparatus into the image of the second-stage apparatus, the movement is ascertained in that the difference of the projected image spot from the first image and the point ascertained by the point detector of the second image must lie within a predefined tolerance range. If this is not the case, this is defined as movement.

A further advantageous development of an embodiment of the invention provides that the two X-ray images are recorded in two physically separate examination installations. As a result it is possible to apply the method according to the invention if the first X-ray image has been taken in a preliminary apparatus that allows a high throughput and the second X-ray image is taken in a second-stage system with a higher resolution and a lower error rate.

A further advantageous development of an embodiment of the invention provides that the two X-ray images are recorded in a single examination installation at different times. It is thereby possible that, at peak times in which a high throughput is required, an item of luggage in which a suspect region has been ascertained can be extracted from the examination installation and kept back until enough time is available to carry out a thorough examination of the suspect region in the same examination installation. The item of luggage is then returned to the same examination installation, but then usually lies there differently than in the first examination.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

Further details and advantages of the invention are explained in more detail with the help of the embodiment shown in the Figures. There are shown in.

DETAILED DESCRIPTION OF THE INVENTION

Figure 1A:
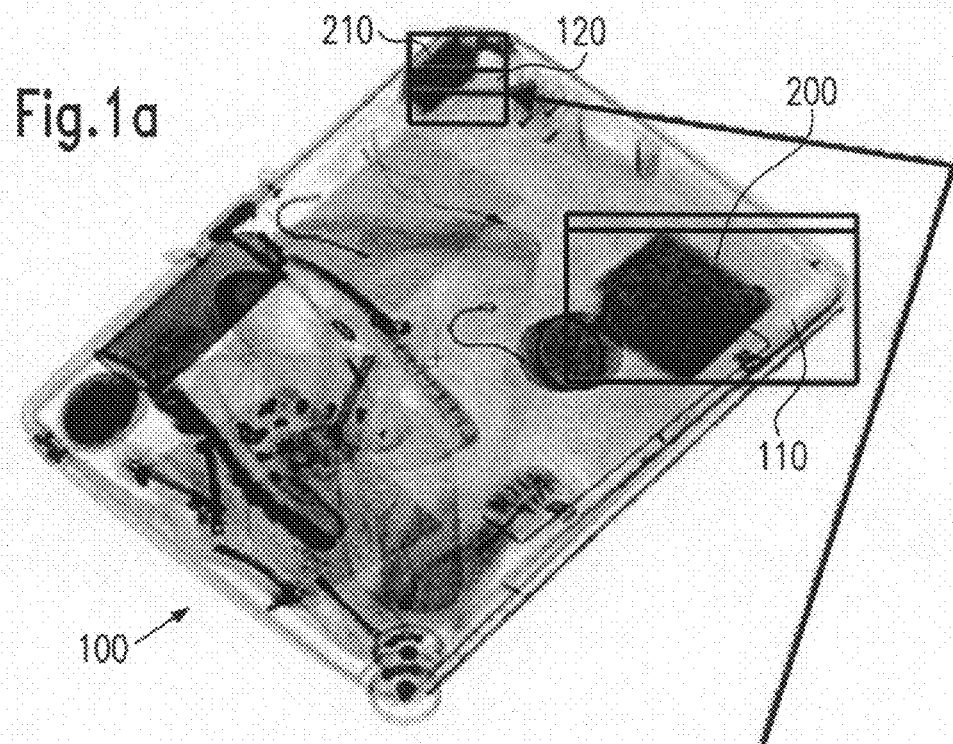
FIG. 1 two X-ray images of the same item of luggage from different examination installations, FIG. 2 a further item of luggage with different objects in which characteristic features are given and these characteristic features can be identified at different positions in the two X-ray images, FIG. 3 the representation of clusters within an item of luggage, one of the clusters having been displaced, and FIG. 4 two proximity matrices, one of the clusters having been displaced in the right-hand representation vis-a-vis the left-hand representation.

FIG. 1a shows a fluoroscopic image of an item of luggage 100 which has been taken by means of X-rays in a first luggage examination installation. In this X-ray image, a first suspect region 110 with a first object 200 and a second suspect region 120 with a second object 210 have been found. The two suspect objects 200, 210 could be for example objects containing explosives or weapons. In order to confirm or refute the suspicion harboured against the objects 200, 210, which are usually recorded in an examination installation with a high throughput and thus a high error rate, the item of luggage 100 is conveyed to a second luggage examination installation with a lower luggage throughput, but also a lower error rate. On the way there, the item of luggage 100 usually changes its position. Moreover, normally the picture geometries between the preliminary apparatus and the second-stage apparatus are different. Thus firstly the change in position of the item of luggage 100 between the preliminary apparatus and the second-stage apparatus must be ascertained. As this procedure is not relevant to the present invention, it will not be discussed in more detail.

The known methods for moving individual objects are carried out by means of a classic segmentation of objects in the fluoroscopic image. The basis of these is that edges and surfaces with comparable amplitude or sufficient physical proximity to single objects are combined. Suspect objects are usually characterized by their high intensities and their edges. For objects in the lower area of the item of luggage 100 in FIG. 1a, such a segmentation is not so easy, however, as the edges are scarcely recognizable and no high intensities and characteristic edges can be identified. Moreover, the change in perspective makes it more difficult to allocate individual objects to one another.

Figure 1B:
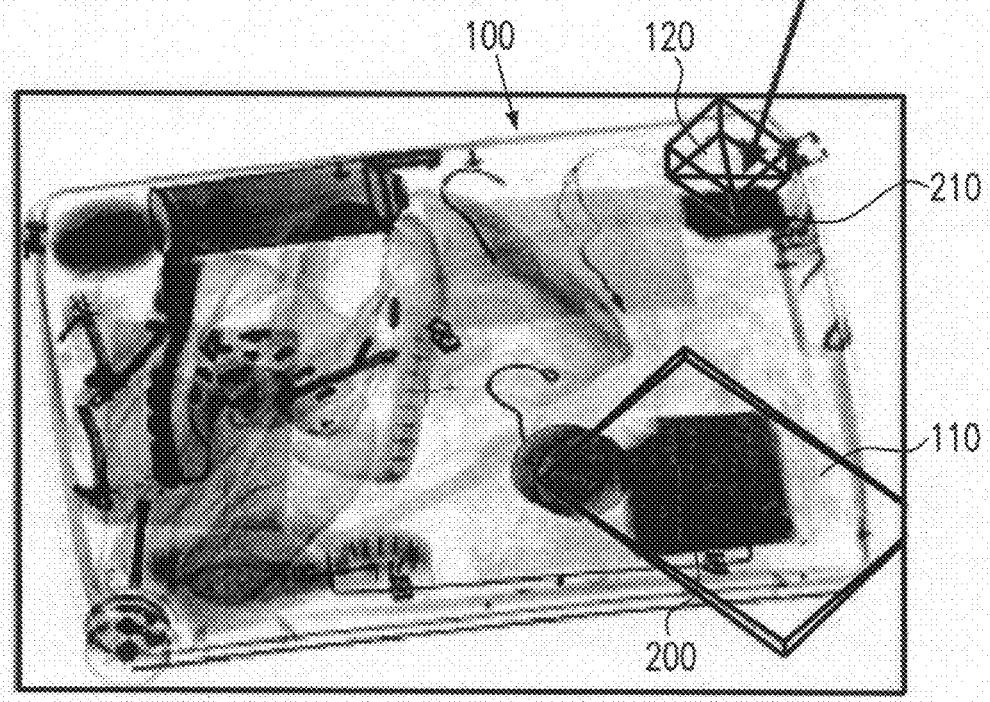

FIG. 1b shows an X-ray fluoroscopic image of the item of luggage 100 of FIG. 1a in a different position in a second-stage apparatus. Using the method not described in more detail, the change in position of the item of luggage 100 has been determined and the two suspect regions 110, 120 ascertained in the preliminary apparatus transferred. The first object 200 has not changed its position within the item of luggage 100 and thus continues to lie in the first suspect region 110. A very rapid precise examination of this first object 200 is therefore possible by checking just the first suspect region 110.

On the other hand, the second object 210 no longer lies wholly in the second suspect region 120, as it has changed its position within the item of luggage 100. This is perfectly possible in particular with items of luggage 100 that are not densely packed. A closer examination of the second object 210 for the risk it poses is thus no longer possible by examining just the second suspect region 120. To be sure about the danger posed by the second object 210, the item of luggage 100 must be fully analyzed again. But this is extremely time-consuming and furthermore renders superfluous the first analysis with determination of the suspect regions 110, 120 in the preliminary apparatus. In such cases, it is therefore necessary to determine not only the suspect regions 110, 120, but whether and where appropriate how the objects 200, 210 located within the suspect regions 110, 120 have changed their position between the two examination installations.

Figure 2:
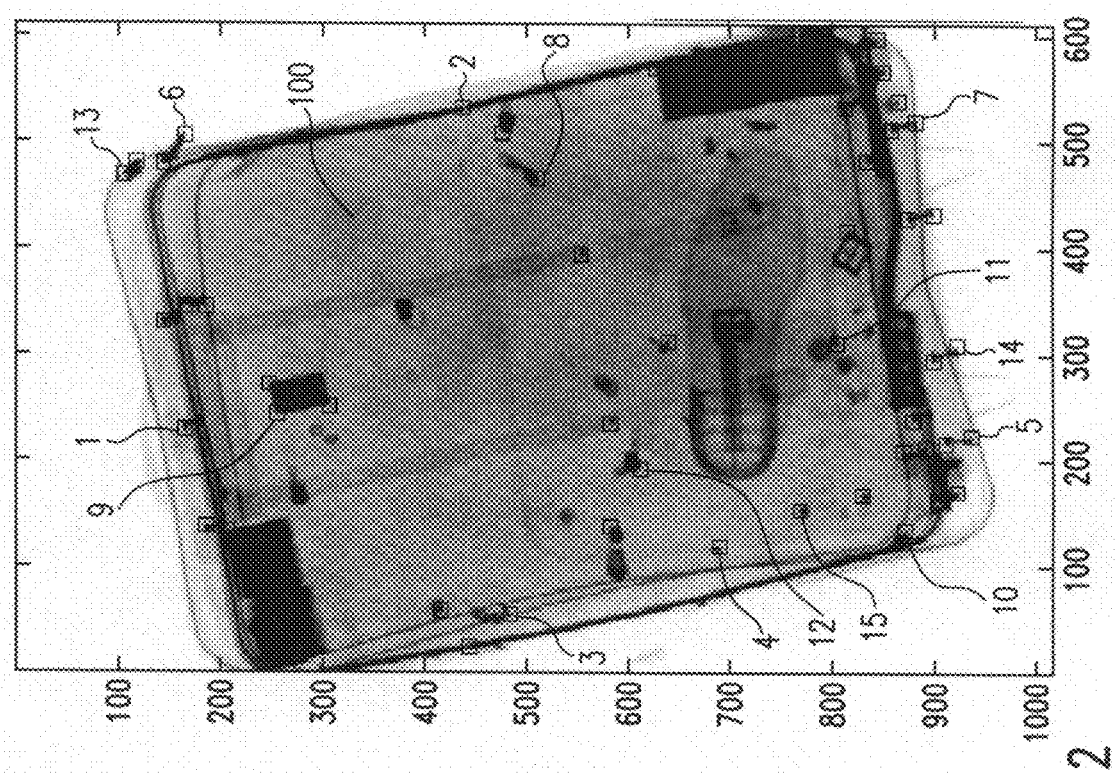
Figure 2:
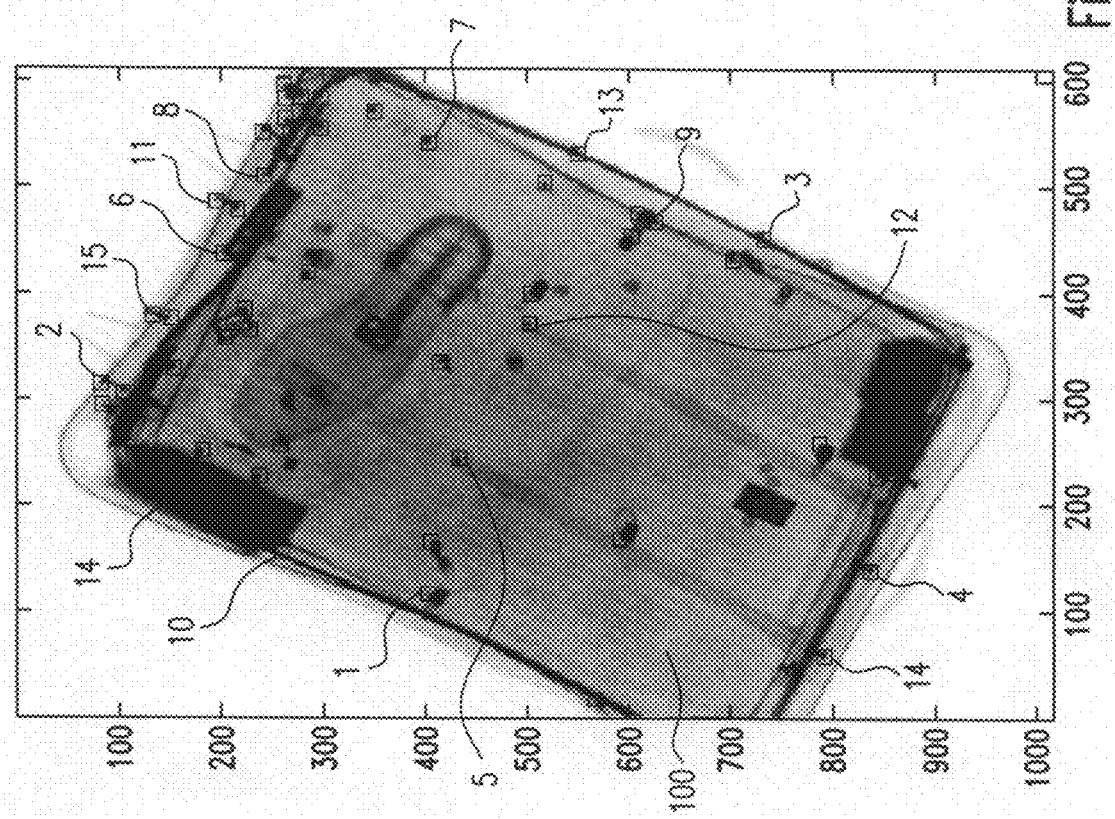

The left-hand representation of FIG. 2 shows an X-ray fluoroscopic image of an item of luggage 100 in a first examination installation; on the other hand the right-hand representation of FIG. 2 shows the same item of luggage 100 in an X-ray fluoroscopic image in a second examination installation, the position of the item of luggage 100 having undergone a change.

According to an embodiment of the invention, points 1-15 are allocated to individual features, for example corners or edges that derive from surface information. These are then fixed regardless of the change in perspective. Points 1-15 are strictly speaking a whole line of consecutive points all of which lie on a single ray from the X-ray source to the detector. The features are extracted using a features filter both in the fluoroscopic image of the preliminary apparatus and in the fluoroscopic image of the second-stage apparatus. This results in a set of points $\{X_i\}$ or $\{Y_i\}$ for each fluoroscopic image. Each set represents images of rays. By determining the global transformation, it is possible to allocate points 1-15 from one fluoroscopic image to the points 1-15 of the other fluoroscopic image. It is assumed that the item of luggage has moved or turned in the conveyor belt plane. It is also checked whether the item of luggage has turned over, i.e. whether the top is now at the bottom and vice versa. If this transformation is known, the ray that is allocated to each individual image spot can be retransformed.

If the item of luggage has not turned over, the transformation then reads:

TransformedRay$_1$:=cos($\omega$)(−(Xg−Ox)$\lambda$+(X−Ox)$\mu$~)+sin($\omega$)(−Yg+Y)+(Xg−Ox)$\lambda$+Ox+T$_1$ TransformedRay$_2$:=cos($\omega$)(−(Xg−Ox)$\lambda$+(X−Ox)$\mu$~)+sin($\omega$)(−Yg+Y)+(Xg−Ox)$\lambda$+Ox+T$_2$ TransformedRay$_{1,2}$ is the x,y component of the transformed image spot and X,Y the coordinates of the image spot in the original image. $\omega$ represents the angle of rotation, T$_{1,2}$ the translation of the case in the conveyor belt plane. Xg, Yg designates the image of a reference point about which the rotation takes place (this is usually the main focus of the image). Ox represents the position of the X-ray tube. $\lambda$ and $\mu$ are operating parameters which stand for the unknown height of the reference point and the points along the ray.

If the item has turned over, the transformation then reads:
TransformedRay$_1$:=cos($\psi$)(−(Xg−Ox)$\lambda$+(X−Ox)$\mu$~)+sin($\psi$)(−Yg+Y)+(Xg−Ox)$\lambda$+Ox+T$_1$ TransformedRay$_2$:=cos($\psi$)(−(Xg−Ox)$\lambda$+(X−Ox)$\mu$~)+sin($\psi$)(−Yg+Y)+(Xg−Ox)$\lambda$+Ox+T$_2$ Beltwidth designates the width of the conveyor belt. The numbering in the two fluoroscopic images is arbitrary, with the result that the same number need not correspond to the same point. However, an allocation is correct only if subgroups of points 1-15 have undergone no changes in position. By sub-groups are meant a plurality of points 1-15 that lie particularly close to one another.

Figure 3:
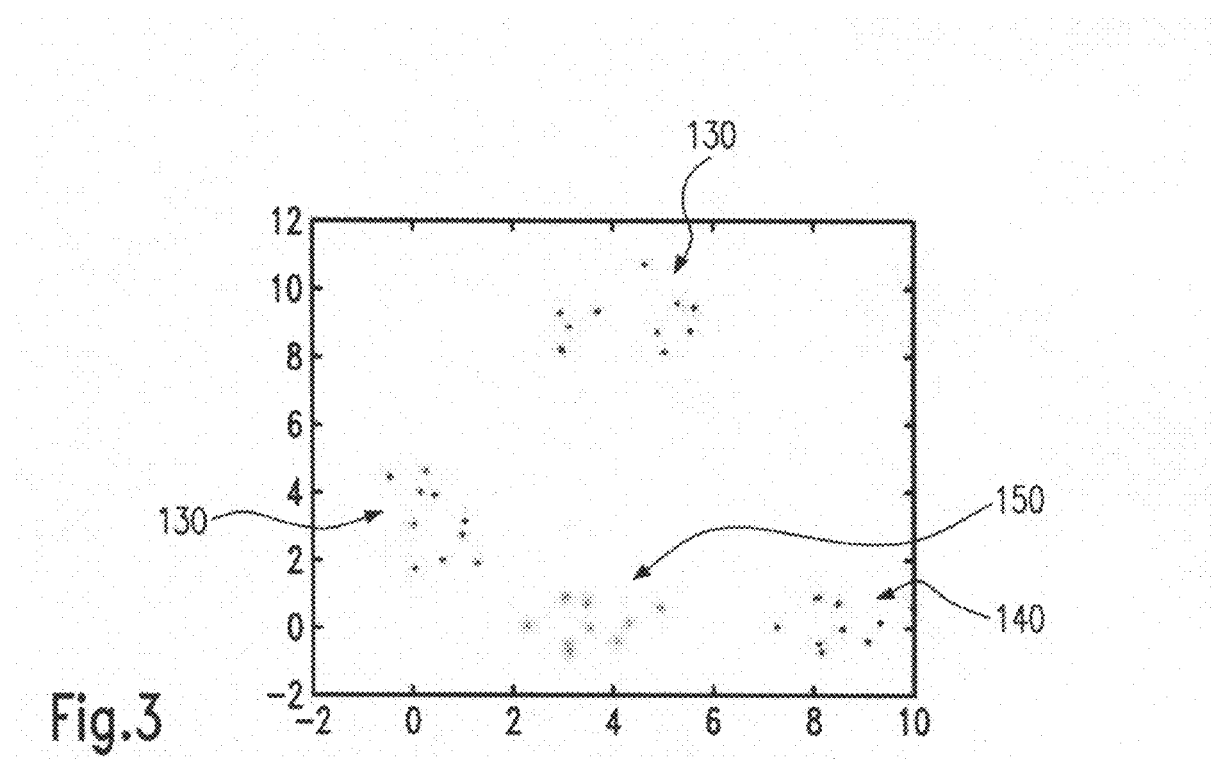
Figure 4:
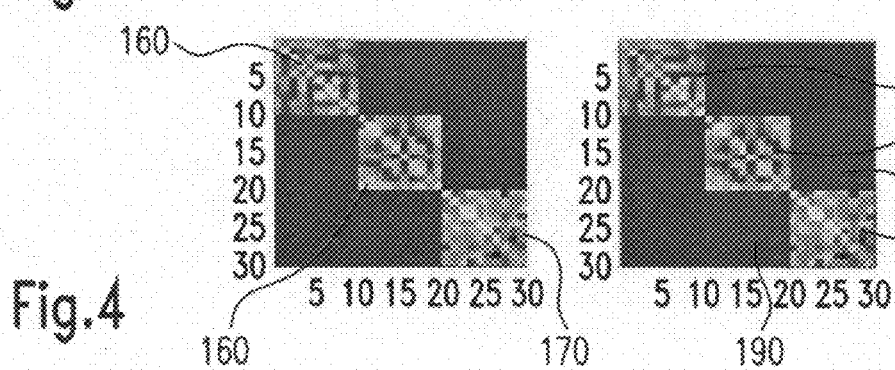

Detection of a change in position of an object 210 (FIG. 1a, b) is illustrated by means of the representations in FIGS. 3 and 4. It is assumed that an object creates a quantity of features the proximity ratios of which are retained even after a physical transformation. This applies even if the object 210 has been displaced. However this does not apply if the object 210 does not have a fixed shape, as is the case for example with a liquid in a plastic bag. The necessary proximity ratios can be determined with the help of a proximity matrix $H_{i,j}=f(x_i, y_j)$. f represents a valuation function that displays high values when points x, y are very close and otherwise low values. It is taken into consideration with the given three-dimensional point coordinates that the individual points 1-15 (FIG. 2) represent rays. Here, the points x, y given in the above-named formula represent points of these rays.

FIG. 3 shows three clusters 130, 140 which represent the features of three objects 200, 210. Two clusters 130 relating to undisplaced objects 200 are shown here. The associated objects 200 have thus not been displaced inside the item of luggage 100 between the taking of the two fluoroscopic images. On the other hand the second object 210, which is represented by the clusters 140, 150, has been displaced inside the item of luggage 100 between the taking of the first and second fluoroscopic images. The undisplaced cluster 140 represents the position in the first fluoroscopic image and the displaced cluster 150 the position of the second object 210 in the second fluoroscopic image.

FIG. 4 shows two proximity matrices, the left-hand matrix corresponding to the situation in the fluoroscopic image of the preliminary stage (as in FIG. 1a) and the right-hand matrix to the situation in the fluoroscopic image of the second stage (as in FIG. 1b). In each of the two matrices three clusters, each of which forms part of one of the clusters 130, 140 of FIG. 3, can be seen along the diagonals from top left to bottom right. In the left-hand matrix, two proximity matrices 160 for undisplaced objects and one proximity matrix 170 for the displaced object 210—but before displacement—are shown. Outside the diagonals no further terms can be seen, so that there are only dark surfaces there. The brighter a section in the matrix, the closer the parameterized points 1-15 of FIG. 2 to one another. In the right-hand matrix, the three proximity matrices 160, 180, each corresponding to an object, are unchanged relative to their counterparts in the left-hand matrix. This means that the proximity matrix 180 of the displaced object 210 is also identical to the proximity matrix 170 before displacement. As a result, this means that the same object is present. This can be seen from the distribution of brightness within each proximity matrix 170, 180. In addition, however, further terms can be identified between the proximity matrix 180 of the displaced object and the middle proximity matrix 170. These proximity matrices 190 can be more clearly identified in the right-hand matrix than in the left-hand matrix. This means that the displaced object 210 (this includes the bottom right-hand bright proximity matrix 180) has moved closer to the object which has not changed its position (this includes the middle proximity matrix 170). In FIG. 3, this can be seen from the distance between the left-hand bottom cluster 130 and the cluster 140, 150 of the displaced object respectively before and after the displacement. To obtain such a representation, it may be necessary to carry out an eigenvector analysis of the proximity matrix. The eigenvectors of the proximity matrix and their allocated eigenvalues provide information about the physical proximity of points (see here: Marco Carcassoni and Edwin R. Hancock, Correspondence Matching with Modal Clusters, IEEE Transactions on Pattern Analysis and Machine Intelligence, Vol. 25, No. 12, December 2003).

In summary, it can therefore be said that it is possible, through the analysis of the proximity matrix 190, to identify objects, as the latter are represented by clusters 130, 140.

The analysis of the movements of an object can be carried out by observation of the proximities of these clusters 130, 140. In order to reduce the error susceptibility in respect of misallocations and noise, a scale analysis can be carried out. The clusters 130, 140 are divided into sub-groups that in turn are subjected to a movement analysis.

The method according to the invention thus makes it possible to detect and analyze movements of individual objects 210 which are located within a suspect region 120. As a result it is possible to adapt the area to be investigated within the second-stage apparatus. As a result, unlike previous methods, the whole item of luggage 100 no longer needs to be analyzed and thus there is a clear saving of time, which is reflected in a clearly increased throughput rate.

LIST OF REFERENCE NUMBERS 1-15 Points (features)
100 Item of luggage
110 First suspect region
120 Second suspect region
130 Cluster relating to an undisplaced object
140 Cluster relating to a displaced object before displacement
150 Cluster relating to a displaced object after displacement
160 Proximity matrix for an undisplaced object
170 Proximity matrix for a displaced object before displacement
180 Proximity matrix for a displaced object after displacement
190 Proximity matrix
200 First object
210 Second object

The invention claimed is:

1. A method comprising:
allocating points of two X-ray images of an item to a quantity of individual features of an object located within the item, wherein the quantity of individual features in each X-ray image has a proximity ratio and a suspect region is defined within the item as a region that includes the object;
extracting each quantity of individual features to produce a set of extracted points for each X-ray image;
identifying, in each set of extracted points, clusters that represent each quantity of individual features;
determining a proximity ratio of each cluster using a proximity matrix $H_{i,j}=f(x_i, y_j)$, wherein f represents evaluation function that displays high values when points are close and that displays low values when points are otherwise;
determining a movement of the object by analyzing proximities of the clusters; and
determining whether the movement of the object makes it possible to examine the object for risks just by examining the suspect region.

2. The method of claim 1, wherein the X ray images are fluoroscopic images.

3. The method of claim 1, wherein the points are allocated to one another using a global transformation.

4. The method of claim 1, wherein the features are extracted using a features filter.

5. The method of claim 1, further comprising performing a scale analysis.

6. The method of claim 5, wherein the clusters are divided into subgroups and the subgroups are subjected to a movement analysis.

7. The method of claim 1, wherein the two x-ray images are taken in physically separated examination installations.

8. The method of claim 1, wherein the two x-ray images are taken in a single examination installation at different times.

9. The method of claim 1, wherein the item is an item of luggage.

10. The method of claim 1, further comprising:
adapting an area to be investigated if it is determined that examination of the object is no longer possible just by examining the suspect region.

11. An item inspection system comprising:
a first item inspection device configured to generate a first X-ray image of an item;
a second item inspection device configured to generate a second X-ray image of the item;
a processing device coupled to at least one of said first item inspection device and said second item inspection device, said processing device configured to:
allocate points to a quantity of individual features of an object located within the item, wherein the quantity of individual features in each X-ray image has a proximity ratio and a suspect region is defined within the item as a region that includes the object;
extract each quantity of individual features to produce a first set of extracted points for the first X-ray image and a second set of extracted points for the second X-ray image;
identify clusters within each set of extracted points that represent the quantity of individual features of the object;
determine a proximity ratio of each cluster within the first set of extracted points using a first proximity matrix $H_{i,j}=f(x_i, y_j)$, wherein f represents evaluation function that displays high values when points are close and that displays low values when points are otherwise;
determine a proximity ratio of each cluster within the second set of extracted points using a second proximity matrix;
identify the object in the first X-ray image and the second X-ray image by identifying a cluster in the first set of extracted points and a cluster in the second set of extracted points that have identical proximity ratios; and
determine, by analyzing proximities of the clusters, a movement of the object and an adapted suspect region to be investigated base on the movement of the object.

12. The system of claim 11, wherein the X-ray images are fluoroscopic images.

13. The system of claim 11, wherein said processing device is configured to allocate the points to one another using a global transformation.

14. The system of claim 11, wherein said first item inspection device is configured to identify the suspect region and said second item inspection device is configured to examine the adapted suspect region to be investigated based on the movement of the object.

15. The system of claim 11, wherein the clusters are divided into subgroups and the subgroups are subjected to a movement analysis.

* * * * *